(12) United States Patent
Nagai et al.

(10) Patent No.: US 12,480,903 B2
(45) Date of Patent: Nov. 25, 2025

(54) LIQUID STATE DETECTION SENSOR

(71) Applicant: KYB Corporation, Tokyo (JP)

(72) Inventors: Yuki Nagai, Kanagawa (JP); Yukinori Kameda, Kanagawa (JP); Takahiro Yoshida, Kanagawa (JP); Ryohei Nakamura, Kanagawa (JP)

(73) Assignee: KYB CORPORATION, Tokyo (JP)

( * ) Notice: Subject to any disclaimer, the term of this patent is extended or adjusted under 35 U.S.C. 154(b) by 282 days.

(21) Appl. No.: 18/259,502

(22) PCT Filed: Dec. 20, 2021

(86) PCT No.: PCT/JP2021/047017
§ 371 (c)(1),
(2) Date: Jun. 27, 2023

(87) PCT Pub. No.: WO2022/145273
PCT Pub. Date: Jul. 7, 2022

(65) Prior Publication Data
US 2024/0060923 A1    Feb. 22, 2024

(30) Foreign Application Priority Data

Dec. 28, 2020   (JP) ................................ 2020-218839
Feb. 26, 2021   (JP) ................................ 2021-029516

(51) Int. Cl.
*G01N 27/07*   (2006.01)
*G01N 27/08*   (2006.01)
(Continued)

(52) U.S. Cl.
CPC ............ *G01N 27/07* (2013.01); *G01N 27/08* (2013.01); *G01N 27/10* (2013.01); *G01N 33/2888* (2013.01)

(58) Field of Classification Search
CPC ........ G01N 27/07; G01N 27/08; G01N 27/10; G01N 33/2888
See application file for complete search history.

(56) References Cited

U.S. PATENT DOCUMENTS

| 4,644,263 A | 2/1987 | Johnson |
| 2007/0018652 A1* | 1/2007 | Broadbent ............. G01N 27/12 324/446 |

(Continued)

FOREIGN PATENT DOCUMENTS

| JP | 2009-002693 A | 1/2009 |
| JP | 2014-153272 A | 8/2014 |
| WO | 2008/143013 A1 | 11/2008 |

*Primary Examiner* — Paul M. West
(74) *Attorney, Agent, or Firm* — Rabin & Berdo, P.C.

(57) ABSTRACT

A liquid state detection sensor includes: an electrode part, the electrode part having a pair of electrodes provided so as to be opposed to each other; a voltage value acquisition time period setting unit configured to set a voltage value acquisition time period, the voltage value acquisition time period being a length of a time period during which an inter-electrode voltage value of the pair of electrodes of the electrode part is acquired; a voltage value acquisition unit configured to acquire the inter-electrode voltage value in the voltage value acquisition time period; and an electrical conductivity calculation unit configured to calculate an electrical conductivity of the liquid on the basis of, among the inter-electrode voltage value acquired by the voltage value acquisition unit, the inter-electrode voltage value acquired after a predetermined time period has elapsed since a start of the voltage value acquisition time period.

2 Claims, 7 Drawing Sheets

(51) Int. Cl.
*G01N 27/10* (2006.01)
*G01N 33/28* (2006.01)

(56) References Cited

U.S. PATENT DOCUMENTS

| | | |
|---|---|---|
| 2009/0315574 A1 | 12/2009 | Akiyama et al. |
| 2010/0212400 A1 | 8/2010 | Nakamura |
| 2015/0160148 A1* | 6/2015 | Stanley ................ G01N 27/228 |
| | | 324/686 |
| 2016/0003756 A1 | 1/2016 | Suzuki et al. |

* cited by examiner

LIQUID STATE DETECTION SENSOR

TECHNICAL FIELD

The present invention relates to a liquid state detection sensor.

BACKGROUND ART

There is a known device that detects a state of an oil that is supplied to a rotating part and a sliding part in a circulated manner and that allows a smooth motion by preventing abrasions in these parts. In the device of this type, two electrodes are arranged in an oil flow passage so as to extend in parallel with each other, and an inter-electrode voltage value is measured by applying AC voltage between these two electrodes, thereby obtaining a dielectric constant and an electrical conductivity of the oil on the basis of thus-obtained inter-electrode voltage value. The state of the oil is detected on the basis of the dielectric constant and the electrical conductivity thus obtained (for example, see JP2009-2693A).

SUMMARY OF INVENTION

However, in the device described in JP2009-2693A, the inter-electrode voltage value becomes unstable immediately after the application of the AC voltage between the two electrodes, and there is a risk in that the accuracy of the inter-electrode voltage value is deteriorated during a period of acquiring the inter-electrode voltage value. There is a risk in that a similar phenomenon is also caused in a case in which the inter-electrode voltage value is acquired by applying DC voltage between two electrodes.

An object of the present invention is to provide a liquid state detection sensor capable of accurately detecting a state of a liquid by obtaining an electrical conductivity with a high accuracy.

According to one aspect of the present invention, a liquid state detection sensor configured to detect a state of a liquid, the liquid state detection sensor includes: an electrode part arranged in a flow passage of the liquid, the electrode part having a pair of electrodes provided so as to be opposed to each other; a voltage value acquisition time period setting unit configured to set a voltage value acquisition time period, the voltage value acquisition time period being a length of a time period during which an inter-electrode voltage value of the pair of electrodes of the electrode part is acquired; a voltage value acquisition unit configured to acquire the inter-electrode voltage value in the voltage value acquisition time period; and an electrical conductivity calculation unit configured to calculate an electrical conductivity of the liquid based on, among the inter-electrode voltage value acquired by the voltage value acquisition unit, the inter-electrode voltage value acquired after a predetermined time period has elapsed since a start of the voltage value acquisition time period.

DESCRIPTION OF EMBODIMENTS

First Embodiment

In the following, the liquid state detection sensor 1 according to the first embodiment will be described with reference to FIGS. 1 to 3.

<Electrical Configuration of Liquid State Detection Sensor 1>

Figure 1:
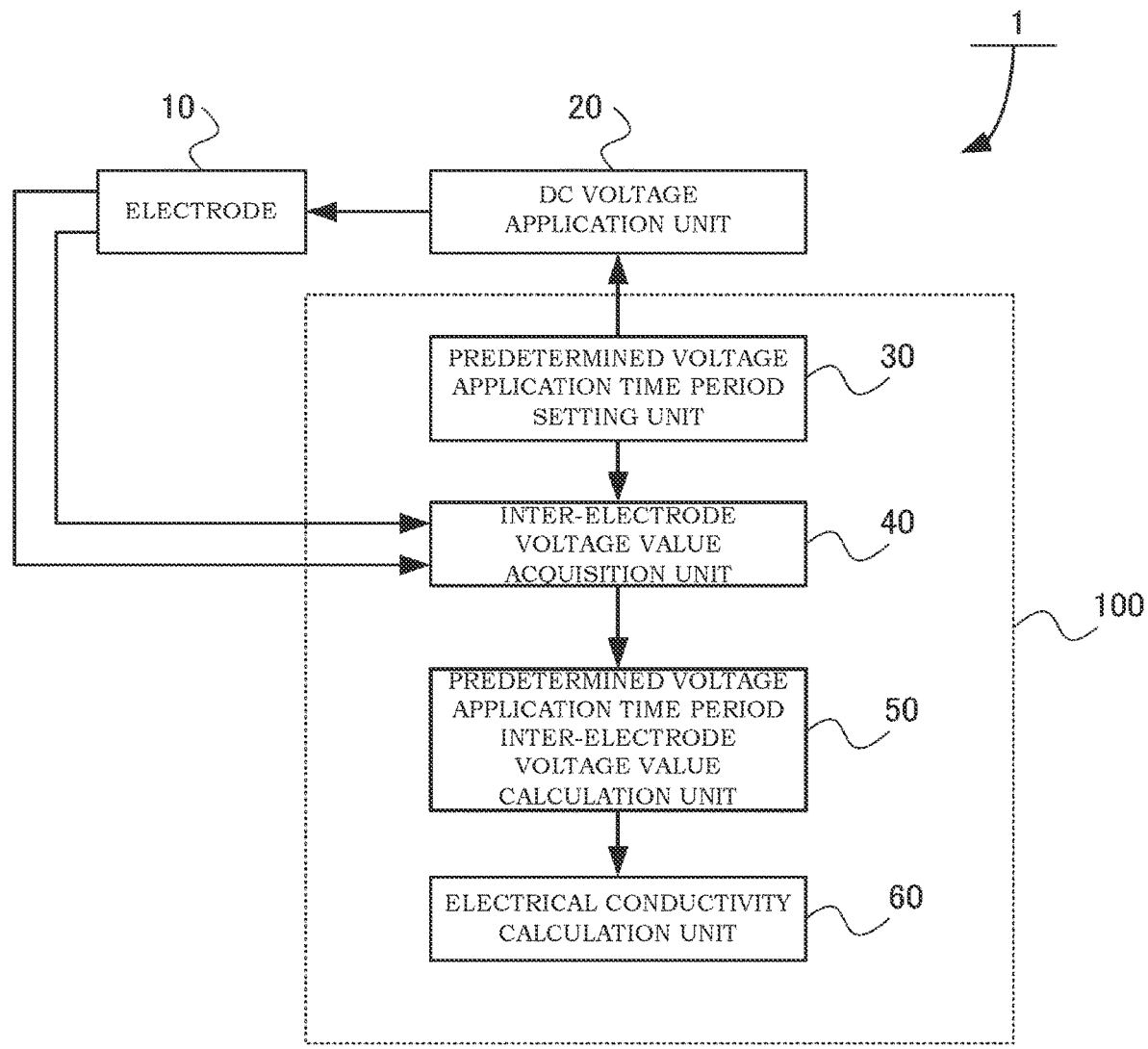
FIG. 1 is a diagram showing an electrical configuration of a liquid state detection sensor according to a first embodiment.

The liquid state detection sensor 1 according to this embodiment detects a state of a liquid, which is a fluid flowing through a flow passage, and as shown in FIG. 1, the liquid state detection sensor 1 is provided with: an electrode part 10; a the DC voltage application unit 20 that applies DC voltage to the electrode part 10; a voltage value acquisition time period setting unit 30 that sets a voltage value acquisition time period that is a length of a time period during which an inter-electrode voltage value of the electrode part 10 is acquired; a voltage value acquisition unit 40 that acquires the inter-electrode voltage value in the voltage value acquisition time period; a voltage value calculation unit 50 that calculates a voltage value on the basis of the inter-electrode voltage value acquired by the voltage value acquisition unit 40; and an electrical conductivity calculation unit 60 that calculates an electrical conductivity of the liquid on the basis of the voltage value calculated by the voltage value calculation unit 50. The voltage value acquisition time period setting unit 30, the voltage value acquisition unit 40, the voltage value calculation unit 50, and the electrical conductivity calculation unit 60 form a part of functions of a CPU 100.

For example, the electrode part 10 has a pair of electrodes that are provided so as to be opposed to each other and is provided on a flow passage through which the liquid flow. The pair of electrodes of the electrode part 10 are concentric cylindrical-shaped electrodes having an inner electrode and an outer electrode that are separated from each other at a distance d. The pair of electrodes of the electrode part 10 are not limited to those of the concentric-shaped type, and for example, they may be those of parallel flat plate-shape and comb-shaped type.

The DC voltage application unit 20 has a voltage source (not shown) that supplies the DC voltage and a connecting part that connects the output from the voltage source to a first electrode and a second electrode of the electrode part 10 in accordance with a control signal from the CPU 100. In order to cancel out an ionization of electrode surfaces of the electrode part 10, it is preferable that the DC voltage application unit 20 apply the positive voltage and the negative voltage to the first electrode and the second electrode of the electrode part 10 in an alternate manner.

The voltage value acquisition time period setting unit 30 sets the voltage value acquisition time period that is the length of the time period during which the inter-electrode voltage value of the pair of electrodes of the electrode part 10 is acquired. Note that the inter-electrode voltage value refers to an electric potential difference between the first electrode and the second electrode of the electrode part 10. In addition, the voltage value acquisition time period refers to the time period from the start to the end of the acquisition of the inter-electrode voltage value by the voltage value acquisition unit 40, and the voltage value acquisition time period also refers to the length of the time period from the start to the end of the application of the voltage between the electrodes of the electrode part 10 by the DC voltage application unit 20. Although the initial value is set in advance for the voltage value acquisition time period, if the voltage value acquisition time period is set so as to be longer, for example, the number of the inter-electrode voltage values acquired by the voltage value acquisition unit 40 is increased as described below, and the accuracy of the inter-electrode voltage value calculated by the voltage value calculation unit 50 is improved. However, in this case, the time period required to calculate the electrical conductivity in the electrical conductivity calculation unit 60 tends to be longer. On the other hand, if the voltage value acquisition time period is set so as to be shorter, although the accuracy of the inter-electrode voltage value calculated by the voltage value calculation unit 50 is lowered, the time period required to calculate the electrical conductivity in the electrical conductivity calculation unit 60 tends to be shorter.

In the above, a duration of the voltage value acquisition time period to be set depends on the purpose of the calculation of the electrical conductivity, system requirements, and so forth. Therefore, for example, a touch panel may be provided on the liquid state detection sensor 1, and the voltage value acquisition time period may be set by a touch operation by a user. In addition, the liquid state detection sensor 1 may be connected to a network, and the voltage value acquisition time period may be set from a management terminal, etc. Similarly, when the electrical conductivity is to be calculated by the electrical conductivity calculation unit 60 at predetermined intervals, it may be possible to set calculation intervals for the electrical conductivity, in other words, as described below, execution intervals for a series of operations for acquiring the plurality of inter-electrode voltage values performed by the voltage value acquisition unit 40.

Figure 3:
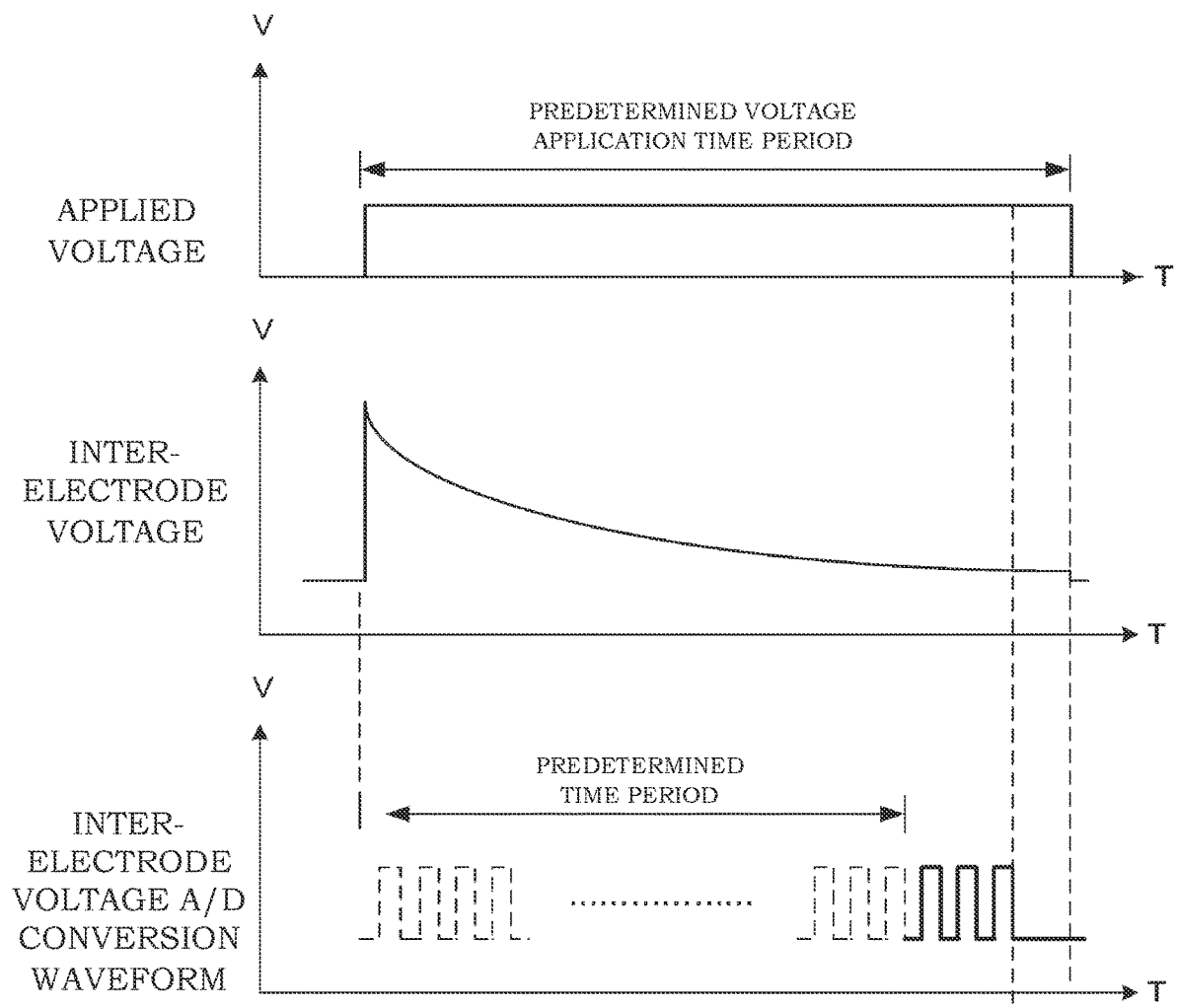
FIG. 3 is a diagram showing a relationship of a voltage value acquisition time period with an inter-electrode voltage value and an A/D conversion waveform of the inter-electrode voltage value in the liquid state detection sensor according to the first embodiment.

As shown in FIG. 3, the voltage value acquisition unit 40 acquires the inter-electrode voltage value during the voltage value acquisition time period at predetermined time period intervals. The voltage value acquisition unit 40 has, for example, an A/D convertor (not shown). The voltage value acquisition unit 40 acquires, for example, the inter-electrode voltage value of the electrode part 10 at the predetermined intervals in accordance with the control signal from the CPU 100. The inter-electrode voltage values are analog voltage values obtained continuously. The voltage value acquisition unit 40 converts the acquired inter-electrode voltage value to a digital signal by the A/D convertor and outputs the converted signal to the voltage value calculation unit 50 of the CPU 100.

The voltage value calculation unit 50 calculates the voltage value during the voltage value acquisition time period on the basis of the plurality of inter-electrode voltage values that are acquired after a predetermined time period has elapsed since the start of the voltage value acquisition time period (the start of the acquisition of the inter-electrode voltage value and the start of the application of the DC voltage in the DC voltage application unit 20) among the inter-electrode voltage values acquired by the voltage value acquisition unit 40. The voltage value calculated by the voltage value calculation unit 50 is, for example, the average value (the arithmetic average) of the plurality of inter-electrode voltage values. The voltage value calculation unit 50 outputs the calculated voltage value to the electrical conductivity calculation unit 60. In the above description, "the predetermined time period" refers to the time period from the start of the acquisition of the inter-electrode voltage value until the inter-electrode voltage value is stabilized in the voltage value acquisition time period, and it also refers to the time period from the start of the application of the DC voltage until the inter-electrode voltage value is stabilized in the DC voltage application unit 20. For example, "the predetermined time period" is 150 ms.

The electrical conductivity calculation unit 60 calculates the electrical conductivity of the liquid on the basis of the voltage value output from the voltage value calculation unit 50. Specifically, the electrical conductivity calculation unit 60 obtains the resistance component between the first electrode and the second electrode of the electrode part 10 on the basis of the voltage value output from the voltage value calculation unit 50 and obtains the electrical conductivity (σ) of the liquid from thus-obtained resistance component. By doing so, the electrical conductivity of the liquid flowing through the flow passage is calculated. Note that the voltage value acquisition unit 40 may continuously acquire the inter-electrode voltage value of the electrode part 10 as the digital voltage value, and in accordance with the control signal from the CPU 100, the electrical conductivity calculation unit 60 may read, at the predetermined intervals, the inter-electrode voltage value acquired by the voltage value acquisition unit 40. Then, the electrical conductivity calculation unit 60 may also calculate the electrical conductivity of the liquid on the basis of the average value (the arithmetic average) of the inter-electrode voltage values that are acquired after the predetermined time period has elapsed since the start of the voltage value acquisition time period among the acquired inter-electrode voltage values. In other words, the voltage value calculation unit 50 is not the essential configuration in the liquid state detection sensor 1.

<Processing Performed by Liquid State Detection Sensor 1>

The processing performed by the liquid state detection sensor 1 according to this embodiment will be described with reference to FIGS. 2 and 3.

Figure 2:
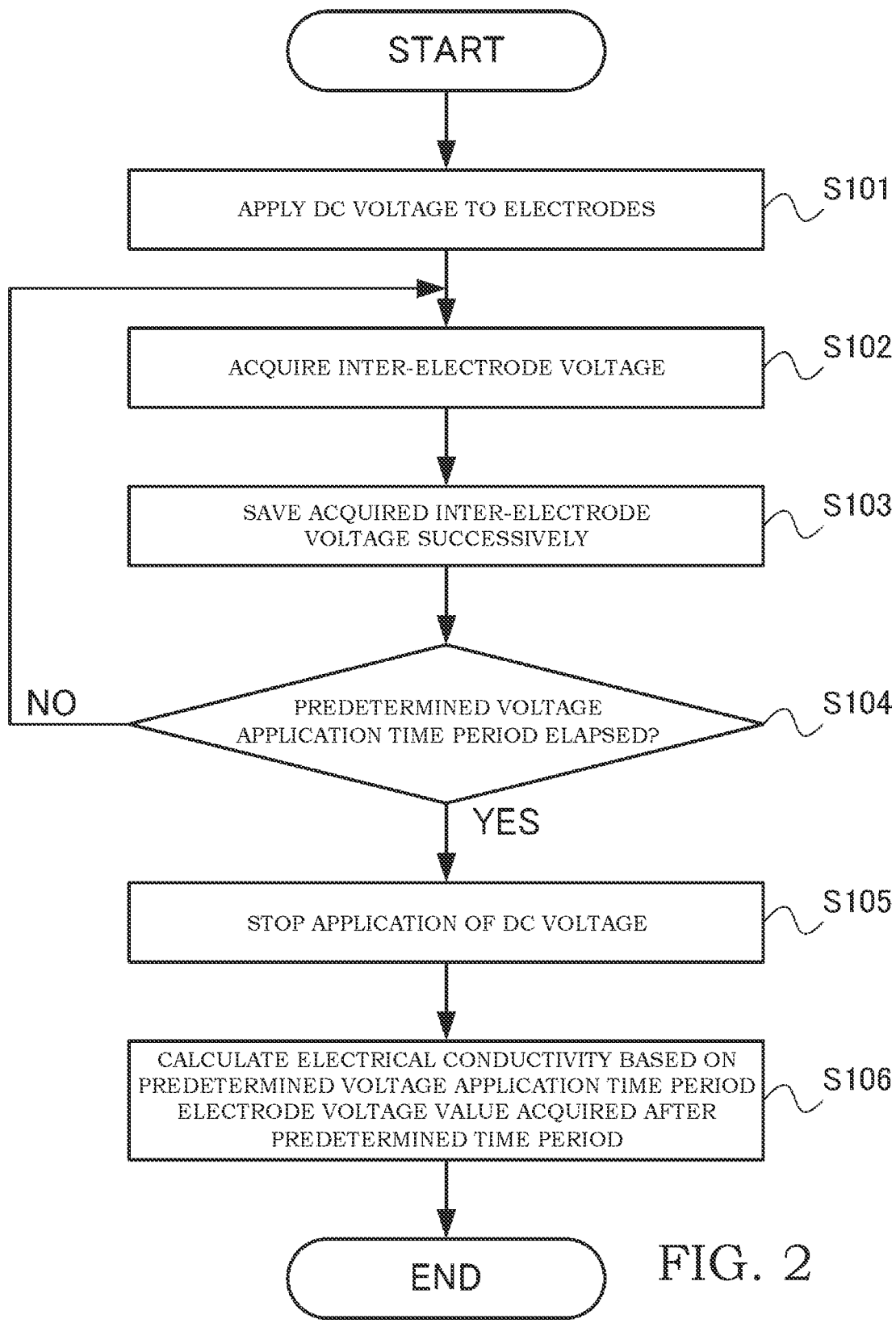
FIG. 2 is a diagram showing a processing flow performed by the liquid state detection sensor according to the first embodiment.

As shown in FIG. 2, the CPU 100 operates the DC voltage application unit 20 to apply the DC voltage to the first electrode and the second electrode of the electrode part 10 (Step S101).

Next, the CPU 100 activates the voltage value acquisition unit 40. The voltage value acquisition unit 40 acquires the inter-electrode voltage value that is the electric potential difference between the first electrode and the second electrode of the electrode part 10 at the predetermined intervals in accordance with the control signal from the CPU 100. The inter-electrode voltage value is the analog voltage value that is obtained continuously. Then, the voltage value acquisition unit 40 converts thus-acquired inter-electrode voltage value to the digital signal by the A/D convertor and outputs the digital signal to the CPU 100 (Step S102).

The CPU 100 stores the inter-electrode voltage value output from the voltage value acquisition unit 40 in a memory unit (not shown) (Step S103).

The CPU 100 determines whether or not the voltage value acquisition time period has elapsed since the start of the acquisition of the inter-electrode voltage value by the voltage value acquisition unit 40 (Step S104). At this time, when the CPU 100 determines that the voltage value acquisition time period has not elapsed ("NO" in Step S104), the processing returns to Step S102.

On the other hand, when the CPU 100 determines that the voltage value acquisition time period has elapsed since the start of the acquisition of the inter-electrode voltage value by the voltage value acquisition unit 40 ("YES" in Step S104), the CPU 100 stops the operation of the DC voltage application unit 20 and activates the voltage value calculation unit 50 (Step S105). The CPU 100 then reads out the inter-electrode voltage value stored in the memory unit and outputs it to the voltage value calculation unit 50.

The voltage value calculation unit 50 derives the voltage value by calculating the average value of the plurality of inter-electrode voltage values that are acquired after the predetermined time period has elapsed since the start of the voltage value acquisition time period (the start of the acquisition of the inter-electrode voltage value and the start of the application of the DC voltage in the DC voltage application unit 20) among the inter-electrode voltage values output from the memory unit, for example. The voltage value calculation unit 50 outputs thus-derived voltage value to the electrical conductivity calculation unit 60.

The electrical conductivity calculation unit 60 calculates the electrical conductivity of the liquid on the basis of the voltage value output from the voltage value calculation unit 50 (Step S106) and terminates the processing.

Operations and Effects

In the liquid state detection sensor 1 in this embodiment, the voltage value acquisition unit 40 acquires the inter-electrode voltage value in the voltage value acquisition time period at the predetermined intervals. The voltage value calculation unit 50 calculates the voltage value from the plurality of inter-electrode voltage values that are acquired after the predetermined time period has elapsed since the start of the voltage value acquisition time period among the inter-electrode voltage values acquired by the voltage value acquisition unit 40 and outputs the calculated voltage value to the electrical conductivity calculation unit 60. The electrical conductivity calculation unit 60 calculates the electrical conductivity of the liquid on the basis of the voltage value output from the voltage value calculation unit 50. In other words, the electrical conductivity calculation unit 60 calculates the electrical conductivity of the liquid on the basis of the plurality of inter-electrode voltage values that are acquired after the predetermined time period has elapsed since the start of the voltage value acquisition time period among the inter-electrode voltage values acquired by the voltage value acquisition unit 40. Therefore, the electrical conductivity calculation unit 60 calculates the electrical conductivity of the liquid on the basis of, among the inter-electrode voltage values acquired by the voltage value acquisition unit 40, the inter-electrode voltage value at least excluding the value acquired soon after the start of the voltage value acquisition time period (soon after the application of the AC voltage to the electrode part 10) at which the inter-electrode voltage value becomes the most unstable. By doing so, in the liquid state detection sensor 1, it is possible to accurately detect the state of the liquid by suppressing the deterioration of the accuracy of the inter-electrode voltage value and acquiring the electrical conductivity with high accuracy.

In addition, in the liquid state detection sensor 1 of this embodiment, the predetermined time period is the time period from the start of the voltage value acquisition time period until the inter-electrode voltage value is stabilized. In other words, because the electrical conductivity calculation unit 60 calculates the electrical conductivity of the liquid on the basis of the stabilized inter-electrode voltage value, in the liquid state detection sensor 1, it is possible to accurately detect the state of the liquid by suppressing the deterioration of the accuracy of the inter-electrode voltage value and acquiring the electrical conductivity with high accuracy.

In addition, the electrical conductivity calculation unit 60 of the liquid state detection sensor 1 in this embodiment calculates the electrical conductivity of the liquid on the basis of the average value of the inter-electrode voltage values after the predetermined time period has elapsed since the start of the voltage value acquisition time period. In other words, the electrical conductivity calculation unit 60 calculates the electrical conductivity of the liquid on the basis of, among the inter-electrode voltage values acquired by the voltage value acquisition unit 40, the average value of the inter-electrode voltage values (the voltage value) at least excluding the value acquired soon after the start of the voltage value acquisition time period at which the inter-electrode voltage value becomes the most unstable. Therefore, it is possible to accurately detect the state of the liquid by suppressing the deterioration of the accuracy of the inter-electrode voltage value and acquiring the electrical conductivity with high accuracy.

Note that, from the experimental results, it was found that there was a difference of about 10 mV in the inter-electrode voltage value between the cases in which the processing was executed by the liquid state detection sensor 1 in this embodiment and in which the processing was not executed. This difference in the inter-electrode voltage value corresponds to about 380 pS/m when converted into the electrical conductivity. If a target accuracy for the electrical conductivity of the liquid state detection sensor is set to be equal to or lower than ±30 pS/m, the accuracy in the case in which the processing is not executed by the liquid state detection sensor 1 deviates greatly from the above-described target accuracy, and the influence thereof is large.

Second Embodiment

A liquid state detection sensor 1A according to a second embodiment will be described with reference to FIGS. 4 and 5. In the first embodiment, "the predetermined time period" is set as "the time period from the start of the voltage value acquisition time period until the inter-electrode voltage value is stabilized" and is set as a predefined time period. In this embodiment, an example in which "the predetermined time period" is set appropriately on the basis of the inter-electrode voltage obtained from the voltage value acquisition unit 40 will be described.

<Electrical Configuration of Liquid State Detection Sensor 1A>

Figure 4:
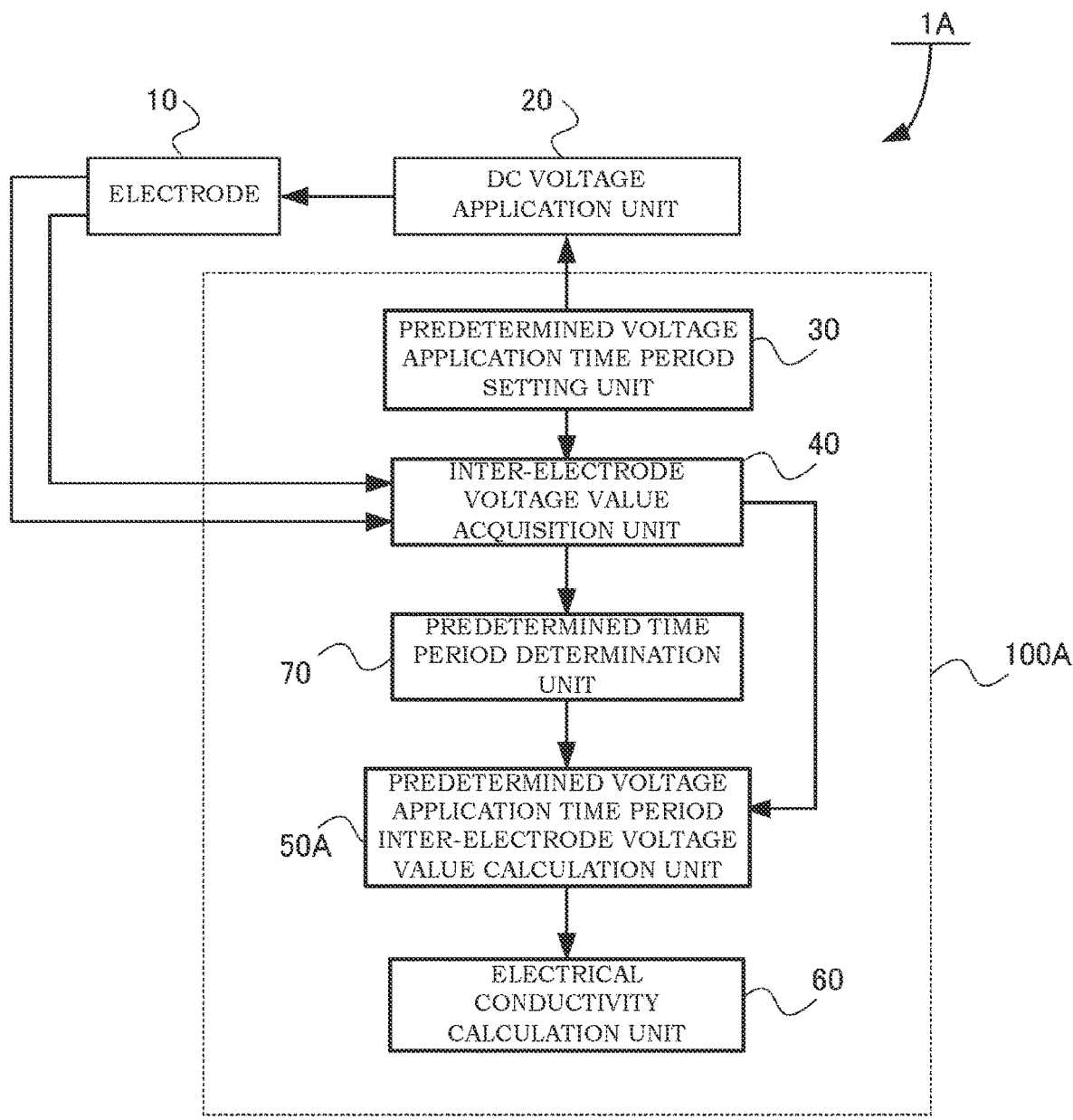
FIG. 4 is a diagram showing an electrical configuration of the liquid state detection sensor according to a second embodiment.
Figure 5:
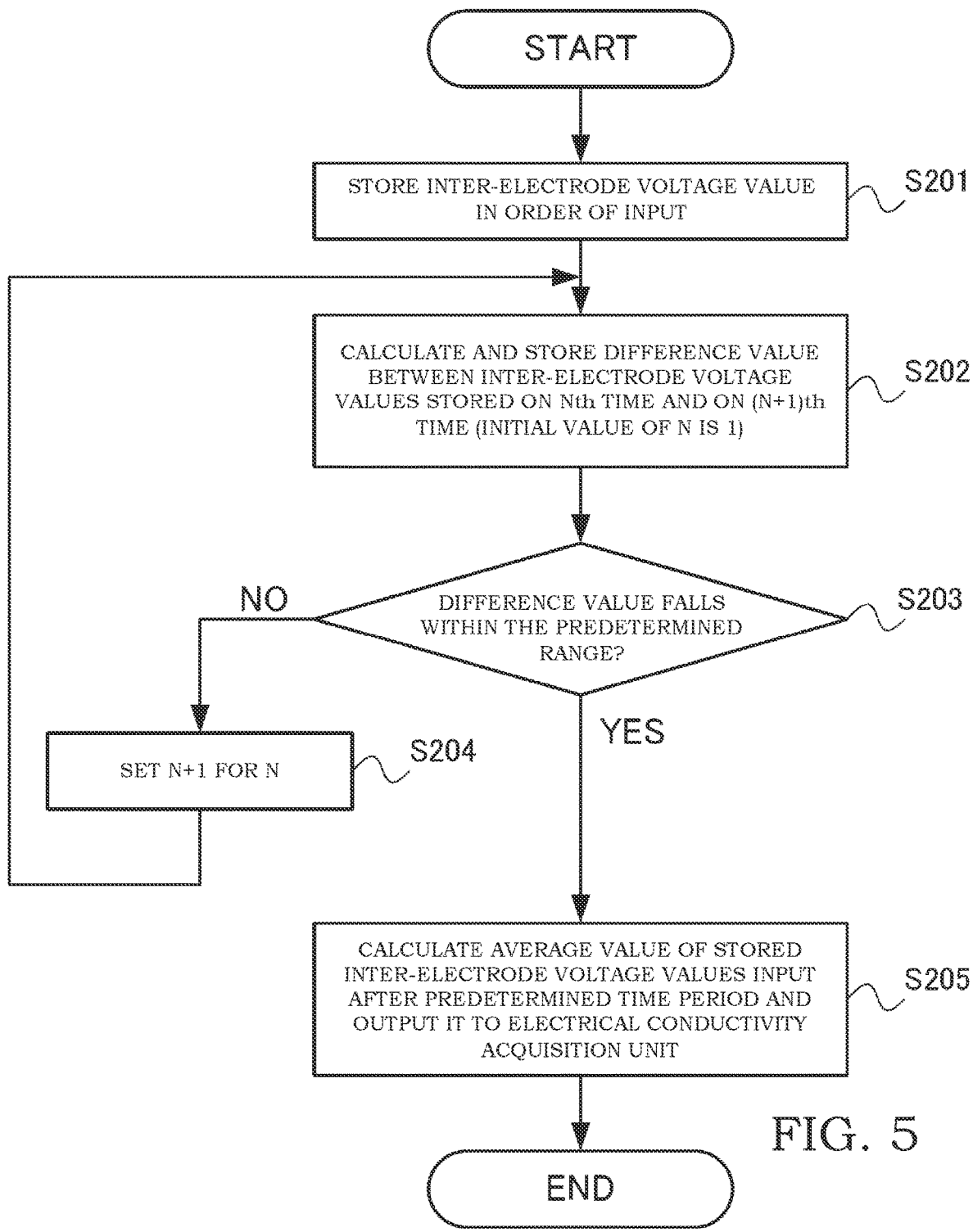
FIG. 5 is a diagram showing a processing flow performed by the liquid state detection sensor according to the second embodiment.

As shown in FIG. 4, the liquid state detection sensor 1A in this embodiment is provided with the electrode part 10, the DC voltage application unit 20, the voltage value acquisition time period setting unit 30, the voltage value acquisition unit 40, a voltage value calculation unit 50A, the electrical conductivity calculation unit 60, and a predetermined time period determination unit 70. Because components that are assigned the same reference signs as those in the first embodiment have the similar functions, the detailed description thereof will be omitted.

The voltage value calculation unit 50A calculates the voltage value on the basis of the plurality of inter-electrode voltage values that are acquired after the predetermined time period, which has been determined by the predetermined time period determination unit 70 as described below, has elapsed among the inter-electrode voltage values acquired by the voltage value acquisition unit 40, and the voltage value calculation unit 50A outputs the calculated voltage value to the electrical conductivity calculation unit 60.

On the basis of the inter-electrode voltage values acquired by the voltage value acquisition unit 40, the predetermined time period determination unit 70 determines the predetermined time period that is the time period from the start of the voltage value acquisition time period until the inter-electrode voltage value is stabilized. Specific determination methods will be described below.

<Predetermined Time Period Determination Processing Performed by Liquid State Detection Sensor 1A>

A predetermined time period determination processing performed by the liquid state detection sensor 1A in this embodiment will be described with reference to FIG. 5.

The predetermined time period determination unit 70 stores the inter-electrode voltage values acquired by the voltage value acquisition unit 40 in the memory unit (not shown) in the order of input (Step S201).

The predetermined time period determination unit 70 calculates a difference value that is a difference between the inter-electrode voltage values stored in the memory unit on Nth time and on (N+1)th time (the initial value of N is 1) and stores the difference value in a storage unit (Step S202).

Next, the predetermined time period determination unit 70 determines whether or not the stored difference value falls within a predetermined range (Step S203). Note that, the "predetermined range" refers to, for example, as shown in FIG. 3, a range of an attenuation level for a case in which the inter-electrode voltage value follows an expected attenuation behavior. In other words, when the difference value is larger than the predetermined range, the input inter-electrode voltage value is zero data. In other words, when the difference value for the inter-electrode voltage values that are acquired by the voltage value acquisition unit 40 is larger than the predetermined range, it is judged that the inter-electrode voltage value that is acquired by the voltage value acquisition unit 40 is not stabilized and that the predetermined time period, which is the time period from the start of the voltage value acquisition time period until the inter-electrode voltage value is stabilized, has not elapsed. When the predetermined time period determination unit 70 determines that the stored difference value does not fall within the predetermined range (when "NO" in Step S203), the processing for setting N+1 for N is performed (Step S204), and the processing proceeds to Step S202.

On the other hand, when the predetermined time period determination unit 70 determines that the calculated difference value falls within the predetermined range ("YES" in Step S203), the voltage value calculation unit 50A determines that the predetermined time period, which is the time period from the start of the voltage value acquisition time period until the inter-electrode voltage value is stabilized, has elapsed. The voltage value calculation unit 50A then calculates the average value of the inter-electrode voltage values that are input after the predetermined time period, in other words, the average value of the inter-electrode voltage values that are stored in the memory unit after the inter-electrode voltage values, which are used for the calculation of the difference value, and the voltage value calculation unit 50A outputs the calculated average value to the electrical conductivity calculation unit 60 as the voltage value (Step S205).

The electrical conductivity calculation unit 60 calculates the electrical conductivity of the liquid on the basis of the voltage value output from the voltage value calculation unit 50A and terminates the processing.

Operations and Effects

In this embodiment, the predetermined time period determination unit 70 appropriately determines the "predetermined time period" on the basis of the inter-electrode voltage value obtained from the voltage value acquisition unit 40. Specifically, the predetermined time period determination unit 70 judges whether or not the inter-electrode voltage obtained from the voltage value acquisition unit 40 is stabilized and determines whether or not the "predetermined time period" has elapsed. Therefore, it is possible to shorten the time period required for the calculation of the electrical conductivity while maintaining the calculation accuracy for the electrical conductivity by the electrical conductivity calculation unit 60, and so, it is possible to accurately detect the state of the liquid within a short time period.

Note that depending on the predetermined time period determined by the predetermined time period determination unit 70, the number of inter-electrode voltage values used for the calculation of the voltage value by the voltage value calculation unit 50A may be reduced. In such a case, a CPU 100A may change the voltage value acquisition time period actively.

Third Embodiment

A liquid state detection sensor 1B according to a third embodiment will be described with reference to FIGS. 6 and 7. In the voltage value acquisition unit 40 of the first embodiment, for example, due to an influence of the disturbance noise, etc., the acquired inter-electrode voltage value may rarely take an abnormal value even after the predetermined time period. Even if the average value is obtained by using such an abnormal value together with other inter-electrode voltage values, the error relative to the true value becomes large, and so, the electrical conductivity cannot be obtained with high accuracy. Therefore, in this embodiment, by detecting and removing an abnormally high inter-electrode voltage value, the electrical conductivity is obtained with high accuracy.

<Electrical Configuration of Liquid State Detection Sensor 1B>

Figure 6:
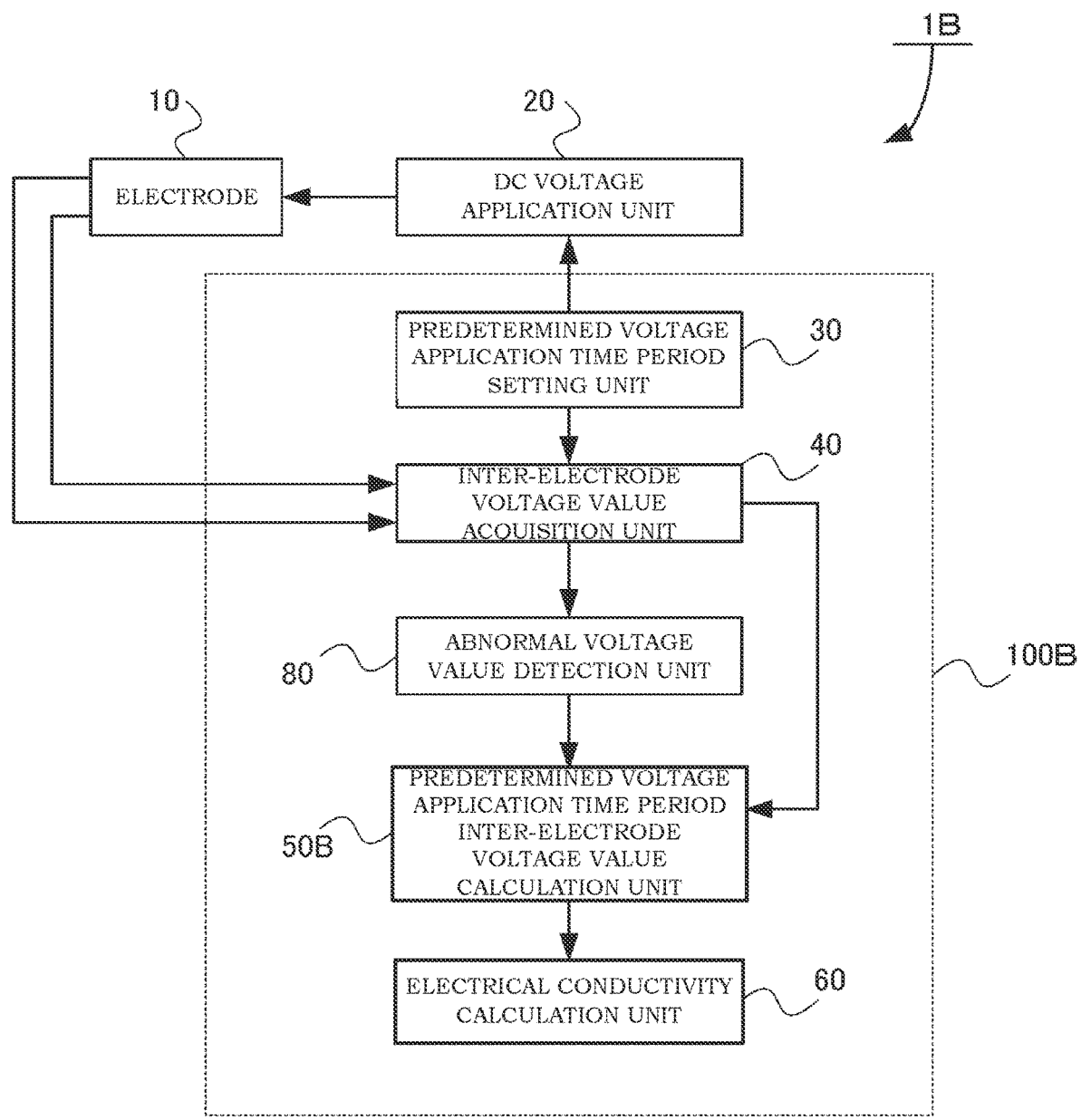
FIG. 6 is a diagram showing an electrical configuration of the liquid state detection sensor according to a third embodiment.
Figure 7:
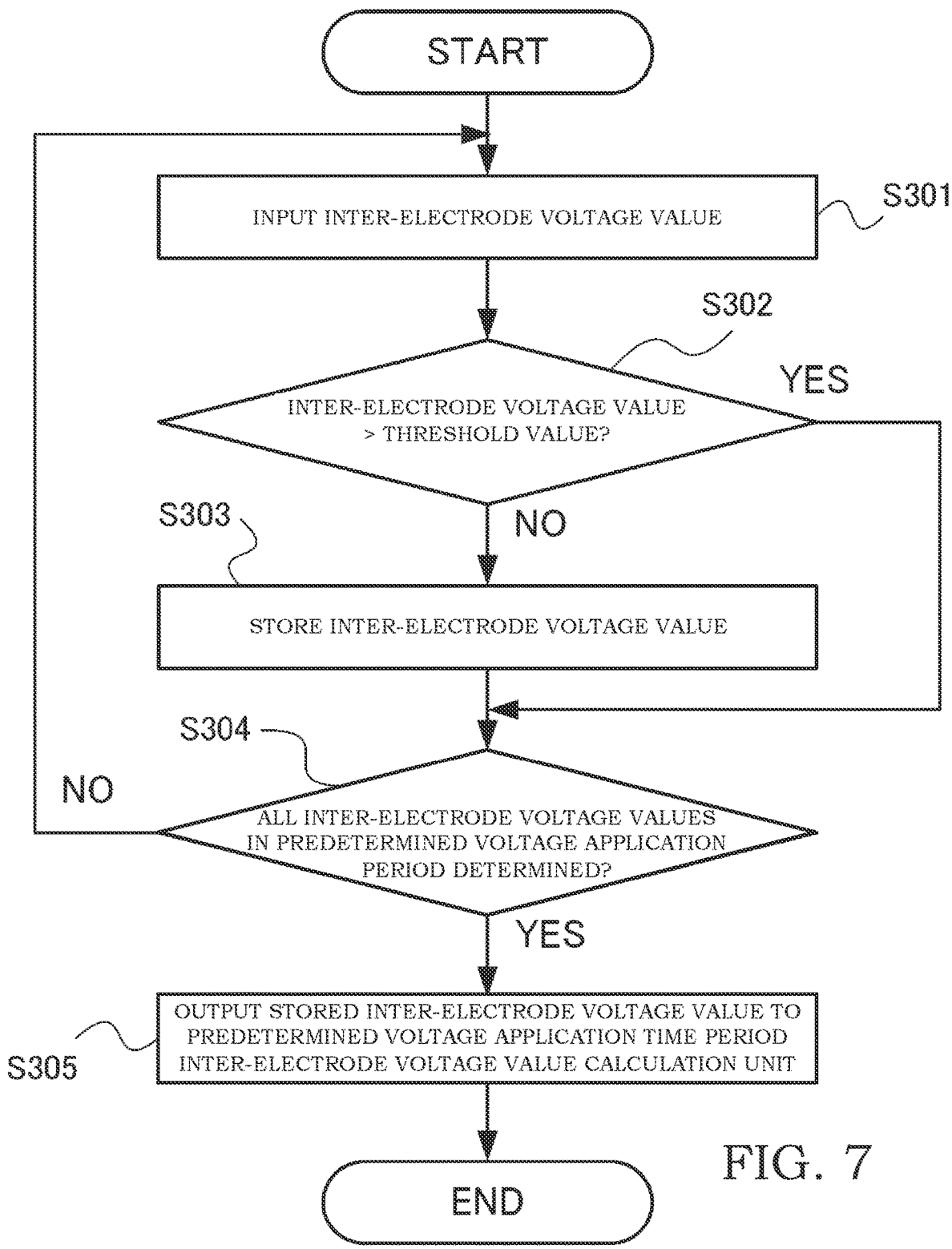
FIG. 7 is a diagram showing a processing flow performed by the liquid state detection sensor according to the third embodiment.

As shown in FIG. 6, the liquid state detection sensor 1B according to this embodiment is provided with the electrode part 10, the DC voltage application unit 20, the voltage value acquisition time period setting unit 30, the voltage value acquisition unit 40, a voltage value calculation unit 50B, the electrical conductivity calculation unit 60, and an abnormal voltage value detection unit 80. Because components that are assigned the same reference signs as those in the first embodiment or the second embodiment have the similar functions, the detailed description thereof will be omitted.

The voltage value calculation unit 50B calculates the voltage value from, among the inter-electrode voltage values acquired by the voltage value acquisition unit 40, the inter-electrode voltage values that are acquired after the predetermined time period has elapsed since the start of the voltage value acquisition time period and that are obtained by removing the abnormal voltage value detected by the abnormal voltage value detection unit 80 as described below. The voltage value calculation unit 50B outputs the calculated voltage value to the electrical conductivity calculation unit 60.

The abnormal voltage value detection unit 80 detects the inter-electrode voltage value exceeding the predefined threshold value for the voltage value among the inter-electrode voltage values acquired by the voltage value acquisition unit 40 and outputs the inter-electrode voltage value, from which the detected inter-electrode voltage value is removed, to the voltage value calculation unit 50B. Specific detection method will be described below.

Note that the abnormal voltage value detection unit 80 may detect the inter-electrode voltage value exceeding the predefined threshold value for the voltage value among the inter-electrode voltage values acquired by the voltage value acquisition unit 40 and may output the detection result to the voltage value calculation unit 50B. The voltage value calculation unit 50B then may obtain the average value of the inter-electrode voltage values (the voltage value) excluding the inter-electrode voltage value, which is the abnormal value, on the basis of the detection result output from the abnormal voltage value detection unit 80 and the inter-electrode voltage value input from the voltage value acquisition unit 40, and the voltage value calculation unit 50B may output it to the electrical conductivity calculation unit 60.

<Abnormal Voltage Value Detection Processing Performed by Liquid State Detection Sensor 1B>

An abnormal voltage value detection processing performed by the liquid state detection sensor 1B according to this embodiment will be described with reference to FIG. 7.

The inter-electrode voltage value acquired by the voltage value acquisition unit 40 is input to the abnormal voltage value detection unit 80 (Step S301).

The abnormal voltage value detection unit 80 compares the inter-electrode voltage value output from the voltage value acquisition unit 40 with the threshold value (Step S302).

When the abnormal voltage value detection unit 80 determines that the inter-electrode voltage value output from the voltage value acquisition unit 40 is smaller than the threshold value ("NO" in Step S302), the inter-electrode voltage value is stored in the memory unit (Step S303). On the other hand, when the abnormal voltage value detection unit 80 determines that the inter-electrode voltage value input from the voltage value acquisition unit 40 is larger than the threshold value ("YES" in Step S302), the processing proceeds to Step S304 without storing the inter-electrode voltage value in the memory unit.

The abnormal voltage value detection unit 80 determines whether or not all of the inter-electrode voltage values output from the voltage value acquisition unit 40 during the voltage value acquisition time period have been subjected to the determination of Step S302 (Step S304). When the abnormal voltage value detection unit 80 determines that all of the inter-electrode voltage values acquired during the voltage value acquisition time period have not been not subjected to the determination of Step S302 ("NO" in Step S304), the processing is returned to Step S301.

On the other hand, when the abnormal voltage value detection unit 80 determines that all of the inter-electrode voltage values acquired during the voltage value acquisition time period have been subjected to the determination of Step S302 ("YES" in Step S304), the inter-electrode voltage values stored in the memory unit are output to the voltage value calculation unit 50B (Step S305), and the processing is terminated.

Note that, for example, when the abnormal voltage value detection unit 80 determines that the inter-electrode voltage value output from the voltage value acquisition unit 40 is larger than the threshold value, the inter-electrode voltage value may be flagged and stored in the memory unit. In the voltage value calculation unit 50B, the voltage value then may be calculated on the basis of the inter-electrode voltage values stored in the memory unit, from which the flagged inter-electrode voltage value is removed.

Operations and Effects

In this embodiment, the abnormal voltage value detection unit 80 detects the inter-electrode voltage value exceeding the predefined threshold value for the voltage value among the inter-electrode voltage values acquired by the voltage value acquisition unit 40 and outputs the inter-electrode voltage value, from which the detected inter-electrode voltage value is removed, to the voltage value calculation unit 50B. The voltage value calculation unit 50B calculates the voltage value on the basis of, among the inter-electrode voltage values output from the abnormal voltage value detection unit 80, the plurality of inter-electrode voltage values that are acquired after the predetermined time period has elapsed since the start of the voltage value acquisition time period, and the voltage value calculation unit 50B outputs the calculated voltage value to the electrical conductivity calculation unit 60. Therefore, because the accuracy of the inter-electrode voltage value that is used for the calculation of the electrical conductivity by the electrical conductivity calculation unit 60 is improved, in the liquid state detection sensor 1B, it is possible to accurately detect the state of the liquid by suppressing the deterioration of the accuracy of the inter-electrode voltage value and acquiring the electrical conductivity with high accuracy.

Because the abnormal voltage value detection unit 80 detects the inter-electrode voltage value exceeding the predefined threshold value for the voltage value among the inter-electrode voltage values acquired by the voltage value acquisition unit 40 and removes the detected inter-electrode voltage value, the number of the inter-electrode voltage values to be used by the voltage value calculation unit 50B for the calculation may be reduced. In such a case, a CPU 100B may actively change the voltage value acquisition time period.

Modification 1

In the voltage value calculation unit 50, 50A, 50B of the first embodiment to the third embodiment, among the inter-electrode voltage values acquired by the voltage value acquisition unit 40, the arithmetic average is calculated for the plurality of inter-electrode voltage values that are acquired after the predetermined time period has elapsed since the start of the voltage value acquisition time period, and thereby, the voltage value to be output to the electrical conductivity calculation unit 60 is calculated. However, without the influence of the disturbance noise, etc., the curve showing the inter-electrode voltage decays over time and then stabilizes. In other words, the longer the elapsed time period after the application of the DC voltage to the electrode part 10 is, the closer the inter-electrode voltage value becomes relative to the true value at that point. Therefore, the inter-electrode voltage value to be output to the electrical conductivity calculation unit 60 may be calculated by using the inter-electrode voltage value that is acquired immediately before the end of the voltage value acquisition time period as the reference, by calculating a weight based on the difference value therewith, and by calculating the weighted average for the plurality of inter-electrode voltage values that are acquired after the predetermined time period has elapsed. By calculating the inter-electrode voltage value as described above, it is possible to improve the accuracy of the inter-electrode voltage value that is used for the calculation of the electrical conductivity by the electrical conductivity calculation unit 60, and by obtaining the accurate electrical conductivity, it is possible to accurately detect the state of the liquid by the liquid state detection sensor 1, 1A, 1B. Note that it is preferred to provide a function to detect the inter-electrode voltage value deviating from the curve showing the inter-electrode voltage due to the disturbance noise, etc. and to execute the processing, etc. for removing the detected inter-electrode voltage value.

Modification 2

In the voltage value calculation unit 50, 50A, 50B of the first embodiment to the third embodiment, among the inter-electrode voltage values acquired by the voltage value acquisition unit 40 during an arbitrary voltage value acquisition time period, the plurality of inter-electrode voltage values that are acquired after the predetermined time period has elapsed since the start of the voltage value acquisition time period are used to calculate the voltage value to be output to the electrical conductivity calculation unit 60. However, the voltage value to be output to the electrical conductivity calculation unit 60 may be calculated after executing, for example, an averaging processing using the voltage value to be output to the electrical conductivity calculation unit 60 that is calculated during the arbitrary voltage value acquisition time period and the voltage value to be output to the electrical conductivity calculation unit 60 that is calculated during the voltage value acquisition time period before the arbitrary voltage value acquisition time period, for example. By calculating the voltage value as described above, it is possible to improve the accuracy of the inter-electrode voltage value that is used for the calculation of the electrical conductivity by the electrical conductivity calculation unit 60 and to accurately detect the state of the liquid by obtaining the accurate electrical conductivity.

The configurations, operations, and effects of the embodiments of the present invention configured as described above will be collectively described.

The liquid state detection sensor 1, 1A, 1B configured to detect the state of the liquid includes: the electrode part 10 arranged in the flow passage of the liquid, the electrode part 10 having the pair of electrodes provided so as to be opposed to each other; the voltage value acquisition time period setting unit 30 configured to set the voltage value acquisition time period, the voltage value acquisition time period being the length of the time period during which the inter-electrode voltage value of the pair of electrodes of the electrode part 10 is acquired; the voltage value acquisition unit 40 configured to acquire the inter-electrode voltage value in the voltage value acquisition time period; and the electrical conductivity calculation unit 60 configured to calculate the electrical conductivity of the liquid on the basis of, among the inter-electrode voltage values acquired by the voltage value acquisition unit 40, the inter-electrode voltage value acquired after the predetermined time period has elapsed since the start of the voltage value acquisition time period.

In this configuration, the voltage value acquisition unit 40 acquires the inter-electrode voltage value of the pair of electrodes of the electrode part 10 in the voltage value acquisition time period. The electrical conductivity calculation unit 60 calculates the electrical conductivity of the liquid on the basis of, among the inter-electrode voltage values acquired by the voltage value acquisition unit 40, the inter-electrode voltage values that are acquired after the predetermined time period has elapsed since the start of the voltage value acquisition time period (the start of the acquisition of the inter-electrode voltage value). In other words, the electrical conductivity calculation unit 60 calculates the electrical conductivity of the liquid on the basis of, among the inter-electrode voltage values acquired by the voltage value acquisition unit 40, the inter-electrode voltage values that are acquired after the predetermined time period has elapsed since the application of the voltage (the DC voltage and the AC voltage) to the electrode part 10. Therefore, the electrical conductivity calculation unit 60 calculates the electrical conductivity of the liquid on the basis of, among the inter-electrode voltage values acquired by the voltage value acquisition unit 40, the inter-electrode voltage value at least excluding the inter-electrode voltage value acquired soon after the start of the voltage value acquisition time period (soon after the application of the voltage to the electrode part 10) at which the inter-electrode voltage value becomes the most unstable. By doing so, in the liquid state detection sensor 1, 1A, 1B, it is possible to accurately detect the state of the liquid by suppressing the deterioration of the accuracy of the inter-electrode voltage value and acquiring the electrical conductivity with high accuracy.

In the liquid state detection sensor 1, 1A, 1B, the predetermined time period is the time period from the start of the voltage value acquisition time period until the inter-electrode voltage value is stabilized.

In this configuration, the electrical conductivity calculation unit 60 calculates the electrical conductivity of the liquid on the basis of the stabilized inter-electrode voltage value. Therefore, in the liquid state detection sensor 1, 1A, 1B, it is possible to accurately detect the state of the liquid by suppressing the deterioration of the accuracy of the inter-electrode voltage value and acquiring the electrical conductivity with high accuracy.

In the liquid state detection sensor 1, 1A, 1B, the electrical conductivity calculation unit 60 is configured to calculate the electrical conductivity of the liquid on the basis of the average value of the inter-electrode voltage value acquired after the predetermined time period has elapsed in the voltage value acquisition time period.

In this configuration, the electrical conductivity calculation unit 60 calculates the electrical conductivity of the liquid on the basis of, among the inter-electrode voltage values acquired by the voltage value acquisition unit 40, the average value of the inter-electrode voltage values at least excluding the inter-electrode voltage value acquired soon after the start of the voltage value acquisition time period at which the inter-electrode voltage value becomes the most unstable. In other words, because the electrical conductivity of the liquid is calculated on the basis of the average value of sufficient numbers of the inter-electrode voltage values that are acquired after the inter-electrode voltage value is stabilized, it is possible to calculate the electrical conductivity that is closer to the true value in a shorter time period. Therefore, in the liquid state detection sensor 1, 1A, 1B, it is possible to accurately detect the state of the liquid by suppressing the deterioration of the accuracy of the inter-electrode voltage value and acquiring the electrical conductivity with high accuracy.

Embodiments of the present invention were described above, but the above embodiments are merely examples of applications of the present invention, and the technical scope of the present invention is not limited to the specific constitutions of the above embodiments.

With respect to the above description, the contents of application No. 2020-218839, with a filing date of Dec. 28, 2020 in Japan, and No. 2021-029516, with a filing date of Feb. 26, 2021 in Japan, are incorporated herein by reference.

The invention claimed is:

1. A liquid state detection sensor configured to detect a state of a liquid, the liquid state detection sensor comprising:
    an electrode part arranged in a flow passage of the liquid, the electrode part having a pair of electrodes provided so as to be opposed to each other;
    a voltage value acquisition time period setting unit configured to set a voltage value acquisition time period, the voltage value acquisition time period being a length of a time period during which an inter-electrode voltage value of the pair of electrodes of the electrode part is acquired;
    a voltage value acquisition unit configured to acquire the inter-electrode voltage value (N+1) times at the same interval during the voltage value acquisition time period, where N is a natural number greater than zero; and
    an electrical conductivity calculation unit configured to calculate an electrical conductivity of the liquid based on, among the (N+1) inter-electrode voltage values acquired by the voltage value acquisition unit, the inter-electrode voltage values acquired after a predetermined time period has elapsed, wherein
    the electrical conductivity calculation unit is further configured to:
        obtain the inter-electrode voltage value at each of an Nth time and an (N+1)th time from the voltage value acquisition unit;
        determine whether a difference between the inter-electrode voltage values at the Nth time and the (N+1)th time falls within a predetermined range, the predetermined range being a range of an attenuation level corresponding to a case in which the inter-electrode voltage value follows an expected attenuation behavior; and
        in response to determining that the difference falls within the predetermined range, set the predetermined time period as a time period from a start of the voltage value acquisition time period to a time of the (N+1)th time; and
        calculate the electrical conductivity of the liquid using inter-electrode voltage values acquired by the voltage value acquisition unit after the (N+1)th time.

2. The liquid state detection sensor according to claim 1, wherein
    the electrical conductivity calculation unit is configured to calculate, as the electrical conductivity of the liquid, an average value of the inter-electrode voltage values acquired during the voltage value acquisition time period after the predetermined time period has elapsed, excluding values acquired before the predetermined time period has elapsed.

* * * * *